United States Patent
Stöver et al.

[11] Patent Number: 5,309,673
[45] Date of Patent: May 10, 1994

[54] PLANT CARRIER

[75] Inventors: Hermann Stöver; Alfons Meyer, both of Twistringen; Hans Stender, Schermbeck; Heinrich G. Hengstermann, Borken, all of Fed. Rep. of Germany

[73] Assignees: Blumen. Stender; MST Dränbedarf GmbH, both of Fed. Rep. of Germany

[21] Appl. No.: 877,648

[22] Filed: May 1, 1992

[30] Foreign Application Priority Data

May 2, 1991 [DE] Fed. Rep. of Germany ....... 4114294

[51] Int. Cl.$^5$ ............................................. A01G 9/00
[52] U.S. Cl. ............................................ 47/59; 47/9; 47/66
[58] Field of Search ............ 47/59, 74, 76, 9 S, 47/66 D

[56] References Cited

U.S. PATENT DOCUMENTS

| 835,585 | 11/1906 | Uffmann | 47/76 |
|---|---|---|---|
| 2,850,842 | 9/1958 | Eubank, Jr. | 47/76 |
| 4,109,442 | 8/1978 | Maasbach | 47/76 |
| 4,794,726 | 1/1989 | Fawcett et al. | 47/9 S |
| 4,918,861 | 4/1990 | Carpenter et al. | 47/59 |
| 5,077,935 | 1/1992 | Stoever et al. | 47/9 S |
| 5,127,187 | 7/1992 | Hattori et al. | 47/59 |
| 5,193,306 | 3/1993 | Whisenant | 47/59 |

FOREIGN PATENT DOCUMENTS

| 2723435 | 12/1977 | Fed. Rep. of Germany | 47/66 D |
|---|---|---|---|
| 2026830 | 2/1980 | United Kingdom | 47/66 D |
| WO8600494 | 1/1986 | World Int. Prop. O. | 47/59 |

Primary Examiner—Carl D. Friedman
Assistant Examiner—Wynn E. Wood
Attorney, Agent, or Firm—Ralf H. Siegemund

[57] ABSTRACT

A plant carrier for cultivating plants, seedlings, seeds, or the like, has at least one layer of plant-growing material, an upper layer of natural fiber, and a lower layer of natural fiber sandwiching the plant growth layer in between, and thread means for stitching and sewing the upper and lower natural fibers layers together is improved by natural fiber layer means combining the upper and lower fiber layers along at least portions of their edges to produce a hose-like cover that is filled with said plant layer of plant growing material.

12 Claims, 2 Drawing Sheets

PLANT CARRIER

BACKGROUND OF THE INVENTION

The present invention relates to a plate-like plant carrier for purposes of cultivating layers, i.e. plants in their very early growth, and to have seeds germinate; and particularly the invention relates to a plant growth structure on or as part of plant tables in horticulture, or to be used directly in the ground, or in flower boxes or other open growth systems or in closed systems (glass houses), all for cultivating plants in their early stages.

It is known to cultivate plants in boxes, in flats, i.e. in flat boxes made of wood or synthetic material. The flat configuration may also be the result of a small, usually square or rectangularly-shaped and usually plastic flower boxes. What happens to the boxes after planting has obtained is often not deemed a factor, but for reasons of ecology it is. Reference is not made here to the situation of the direct re-use of the boxes after emptying them for planting; of course such boxes can be used over and over again for the same purpose. But presently it is of interest here are that there are situations in which, for some reason, it is not desirable to disturb the seedlings or plants but to leave the container in place, i.e. the plants are just planted in their container. This may readily result in ecological problems.

The principle of containing a plant and root system in a small, box-like container carries with it the following problem: a certain amount of water retention is required so that the root system and surrounding soil will not dry out too quickly. On the other hand, if insufficient drainage is provided, then the plant system may begin to rot or be prone to other forms of sickness.

It is also known to use very finely ground peat and to press a certain portion into a rod-like configuration. This peat rod is then surrounded by and held in a net made of synthetic material which is configured in this case in that it can deform elastically. Such a rod or strand is then cut into a suitable length and is used for individual cultivating and planting of seeds and small plants. If the pressed strand is watered it will swell as the surrounding synthetic net expands. The finely ground peat, however, has a very small pore volume when compressed, which has an effect on the growth of the plant. In addition, any capillary action is rather poor in compressed peat. Hence, such finally ground peat is a poor agent as far as rewetting is concerned.

Certain greening flats are known, for example, for use as roof covers or as embankment covers. In the latter case, the task is to have the roots of the plants traverse their container as fast as possible so that the roots physically combine with the underlying soil. In this way one makes sure that the entire arrangement is rapidly and so-to-speak naturally anchored to the ground.

On the other hand, roof covers are usually made of mats which contain both plant food and grass seed. These mats are constructed such that the cover on which the mat rests should not receive much moisture, that is, the mat is comprised, for example, of a synthetic layer upon which are deposited layers of nutrients and other plant food to enable the grass to germinate and grow. These mats are constructed for exactly that particular purpose, namely, for providing a green cover on a roof, and these rather highly, specialized mats are usually not useful in a different environment.

DESCRIPTION OF THE INVENTION

It is an object of the present invention to provide a new and improved plate-like plant support which can be used in different environments, which will decompose completely and contains all the nutrients and plant-food necessary for the desired germination and growth of plants.

It is a particular object of the present invention to improve plant growing plates of the type made of different layers such as supporting layer(s) and at least one plant layer;

In the following and in the present context, the term 'plant layer' will be used in reference to a layer consisting of or containing nutrients and/or nutrient-containing material and which also contains seeds, seedlings, little plants, alternatively the plant layer is provided to receive plants in that such plants are subsequently planted in it. A plant layer is thus a layer of plant growth providing material that may include the plant material itself (e.g. seeds or seedlings), or a plant layer of plant growth material is provided for receiving little plants or seeds.

In accordance with the preferred embodiment of the present invention, it is suggested to provide such a plant carrier in a multi-lamina or multi-strata configuration wherein natural fibers and plant layers as defined form substrates which are alternatingly arranged, one on top of the other, and they are step-seam connected together to establish a more or less solid body. Preferably the plate is configured in three layers in which the bottom layer is natural fiber, an intermediate plant layer, (i.e. a plant containing layer and/or a growth enhancing substrate), and a third top layer is again made of a natural fiber. All these three layers are interconnected through sowing and constitute a more or less solid plate-like body. More of these layers may be provided but basically the uppermost and lowermost layers should be made of natural fiber so that whatever plant layers are provided in between are sandwiched in between the natural fibers.

The upper and lower natural fiber layers are either made of an integral construction or are interconnected either directly or through a fiber intermediary to establish a partially or completely enclosing layer-cover of natural fiber material. The integral construction may, for example, consist of a round or flat hose, and this hose, with the various other layers in between, may then be cut into portions of suitable lengths for further use. In its most complete form, the natural fiber layer is one integral flat sack. Hence the basic concept underlying the invention is to provide for a plate-like plant carrier which confines the plant layer substantially or completely and will decompose completely so that it does not present any ecological problem. The plate thus made can be structured to dimensions common in the trade and particularly convenient for resale, i.e. for the buyer and his intention, particularly his way of transporting such individual flats to his garden or the like.

It is essential in this regard that this plate/flat is composed only of natural fibers on the one hand, and of plant nutrients on the other hand. In order to keep this arrangement together, the natural fiber should come in a configuration of a mesh or it is woven into a sack-like configuration. As stated, there will always be several layers placed one on top of the other, with the simplest configuration being comprised of two natural fiber layers combined to form a hose and a plant layer in between. The overall thickness is basically determined by the plant layer, that is, the seed/root-containing substrate and the surrounding nutrients; and all this is embedded in or enclosed by most or all sides in a natural fiber covering.

The kind of plants and the strength, compactness or extension of the root system are size determining factors too. Here, then, and depending on the kind of plant to be accommodated, a multi-layer plate is, for example, made which has, as stated, upper and lower natural fiber mesh or woven layers and a plant layer interior substrate; in addition, a coco-nut fiber layer is included between the natural fiber layer and the plant layer. In such a plate the plants will first root in the cultivating substrate (i.e. the plant layer proper as defined above), provided that the latter substrate remains moist. The plant then grows into the coco-nut layer underneath.

Generally speaking, the plates constructed as per the invention can easily be maintained properly and sufficiently moist. Excess water will drain off so that, in fact, it is avoided that excessive moisture will cause root damage through sickness. Decisive is that the natural fiber including coco-nut fiber yields a very suitable capillarity. In addition, the food and nutrients can be added if needed. So, the cultivating substrate (plant layer) will be maintained as an excellent medium for growth and cultivation of plants. This function is carried out together with the fiber layer, for example the coco-nut layer underneath.

In many cases the plant layer, so to speak, comes with seed, seedlings or little plants, at the time the plate is assembled. On the other hand, the plant layer may originally be devoid of these items, there will be just food and physical support structure. Now, small plants or seeds are placed, for example, through the upper layer which is, of course, a natural fiber layer provided with slots or apertures or even a fairly large opening through and into which the plants, seedlings or seeds themselves can be directly pushed for placement into the plant layer.

Plate like plant carriers of this kind can be used for cultivating plants of any kind, ornamental decorative plants, water plants, any kind of flowers, and so forth. They are characterized by friendliness to the ecology because they rot in their entirety. After a while when the plants have grown and are developed sufficiently for being repotted or the like, whatever residue of the plate remains can be used as compost and reused as plant growth.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Proceeding now to the detailed description of the drawings, FIG. 1 illustrates the most simple configuration of an intermediate product for making a plate-like plant carrier in accordance with the present invention. Altogether three layers are shown, namely, an upper layer made of natural fiber 1, and a lower layer also made of natural fiber 1a. These layers may be of a mesh or woven construction such that a certain coherency and combinatory configuration is present as far as such a layer itself is concerned. A plant layer, i.e. plant or seed and nutrient and plant food containing substrate 2, is provided between layers 1 and 1a. Reference Numeral 4 refers to threads and sewing seams for holding the layers together. The stitching is shown schematically but of course there is a continuous thread or pair of threads provided in the usual fashion for sewing these parts together.

FIG. 2 shows the same elements and components but can be regarded as a smaller scale version of what is shown in FIG. 1 with the added proviso that as per this invention at least some of the sides, and in this case the right hand side and the left hand side of the layer and strata configuration of FIG. 1, are closed. That means top layer 1 and bottom layer 1a are interconnected through sides 1b and 1c. In fact, the configuration of covering and enclosing the plant layer 2 by a natural fiber layer may be carried through one continuous wrapping, that is to say, layers 1, 1a, 1b and 1c, actually constituting different portions of one and the same natural fiber layer.

Figure 1:
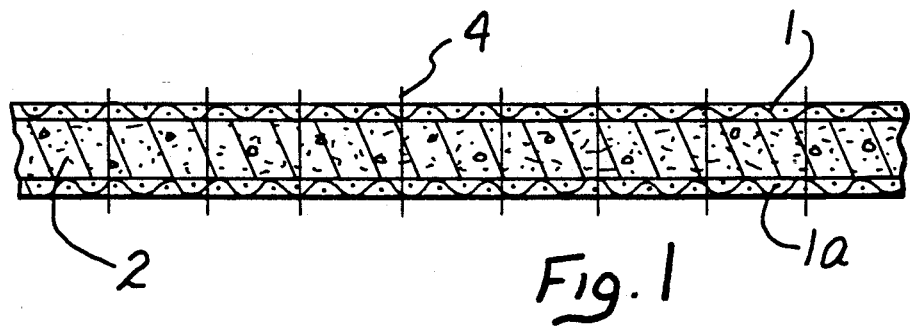
FIG. 1 is a cross section through a plate to be completed in accordance with the preferred embodiment of the present invention and showing three layers or strata.

As a consequence, a hose of flat configuration is established, but owing to the deformability the cross sectional contour can be of any kind except that by virtue of the stitching and sewing together through the thread 4, a rectangular cross section plate results. In the direction perpendicular to the plane of the drawing, the configuration must be open but the end of the hose, basically above and below the plane of the drawing of FIG. 2, can also be closed by means of a, or the same, fiber material so that in fact the entire plate configuration is closed on all sides by means of natural fiber. In other words it is a preferred form of practicing the invention to have an all-around enclosure made of natural fiber and enclosing the plant layer 2.

Figure 3:
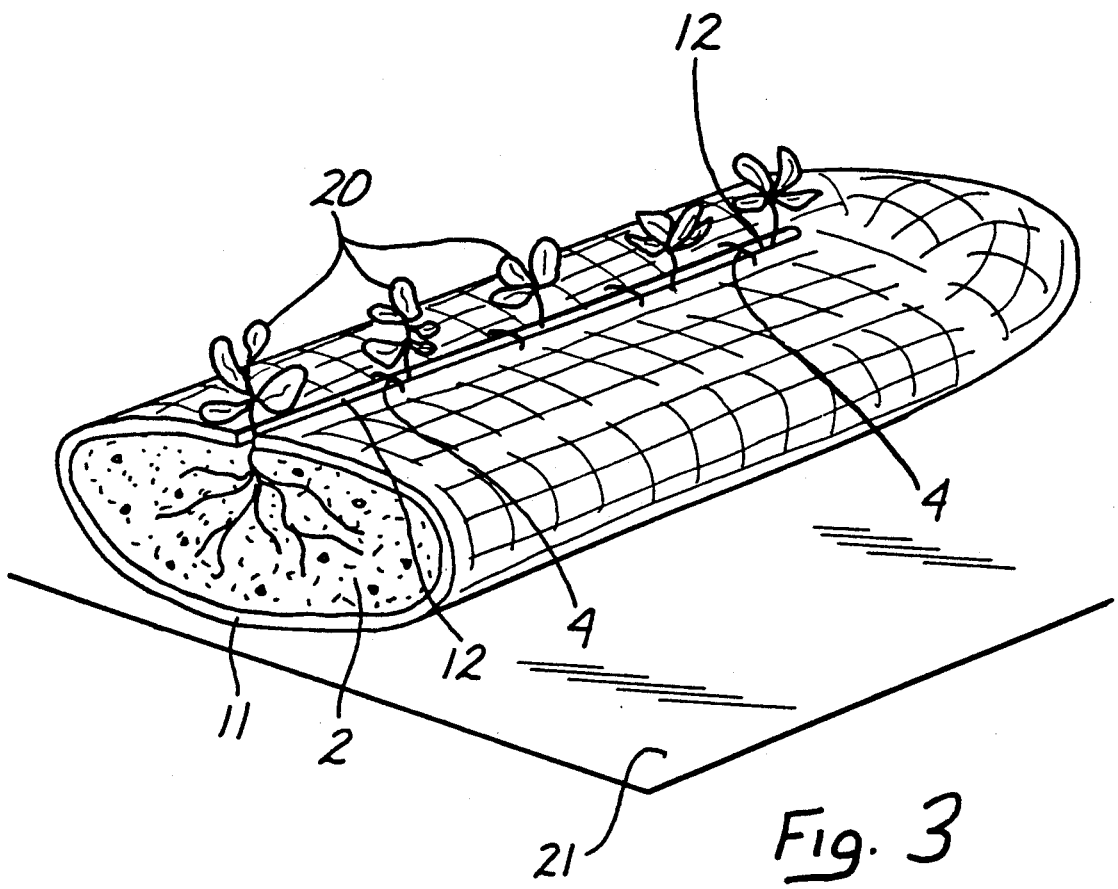
FIG. 3 illustrates a plant carrier sack partially cut open with plant growth from a top slot.

FIG. 3 shows such a flat sack 11; a cut open portion reveals the plant layer inside of the natural fiber sack 11. A slot 12 on top is provided for the plants 20 to emerge from this flat sack.

Figure 2:
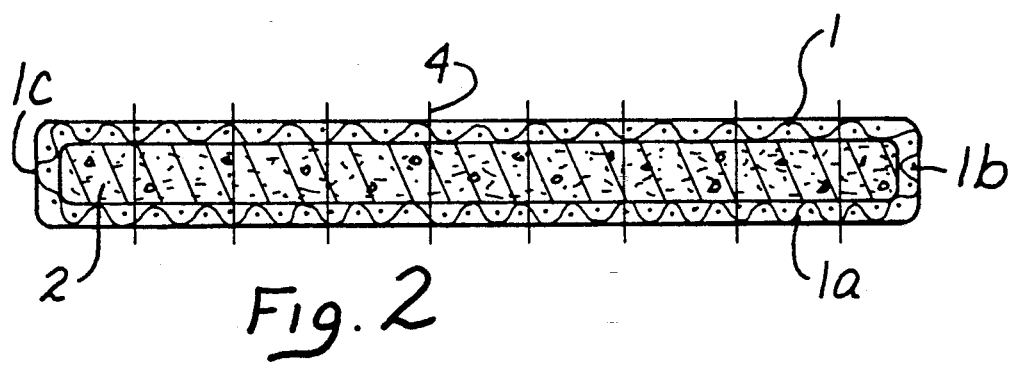
FIG. 2 shows the next stage, namely a complete enclosure to obtain a flat, hose-like configuration, the plate being shown in cross-section with what could be called an axis of such a hose extending perpendicular to the plane to the drawing.
Figure 4:
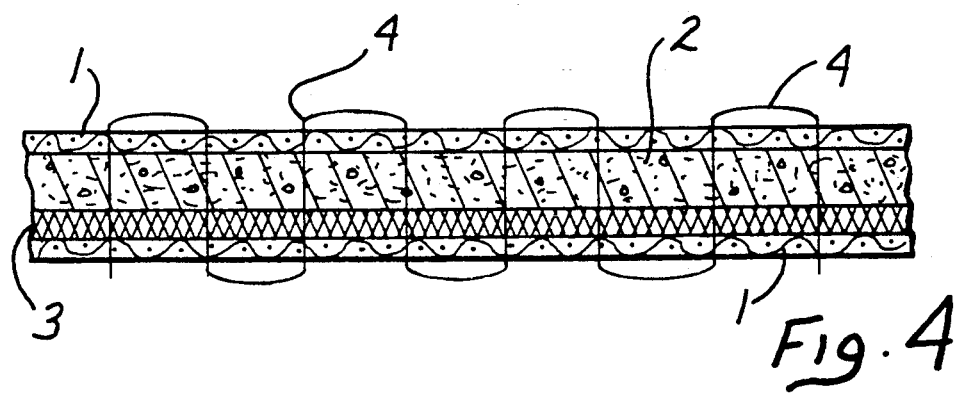
FIG. 4 is a multi-layered configuration in cross section analogous to FIG. 1 but with specifically four layers.

Proceeding now to FIG. 4, elements of the kind referred to above in reference to FIG. 1 and 2 are included here, but there is an additional natural fiber layer 3 provided which may be of a different material than the layers 1, 1a, etc. This natural fiber layer 3 has the task of accommodating roots as they grow out of the layer 2. It can be readily seen that this layer 3 is of interest and may actually be needed if the plants being grown have an extensive root system prior to the time of separation and individual potting or other replanting. The sack of FIG. 3 may also include this additional layer 3.

Figure 5:
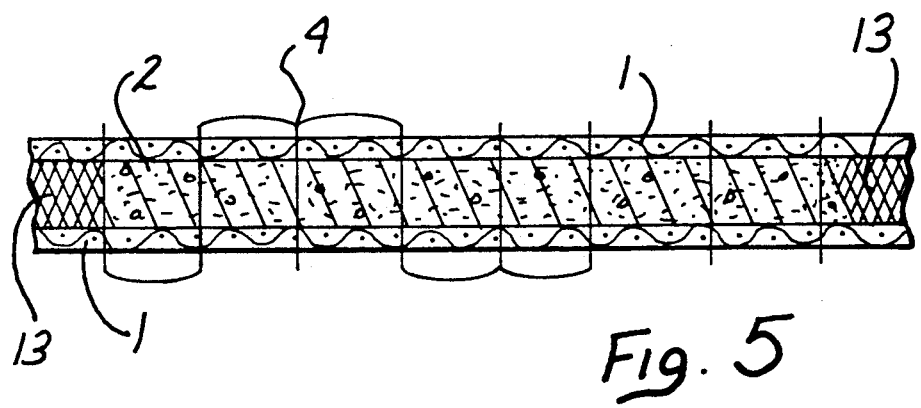
FIG. 5 illustrates a hose-like configuration but with a different side enclosure using a basic configuration of FIG. 1 but being analogously applicable to the layer arrangement of FIG. 4.

Proceeding now to FIG. 5, a plate and plant carrier is shown wherein upper and lower layers are provided as outlined above, (i.e. these are layers 1 and 1a), but they are in this case separate and not directly combined in an integral configuration; rather lateral closure is provided through additional natural fiber material such as 13 and being arranged along the edges of this plate to enclose the plant layer 2. The entire arrangement is again, of course, stitched together and in this combined and compact configuration the plant layer 2 cannot possibly fall out in any direction.

Figure 6:
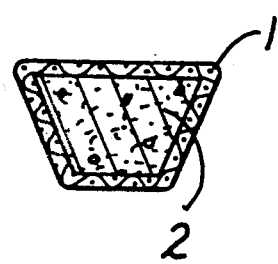
FIG. 6 illustrates a particular flower box configuration.

FIG. 6 illustrates how the invention can be adapted to the particular configuration of a small or large flower pot such as are used in a free standing arrangement, on balconies or the like. There is an inner plant layer 2 just as before and in this case also a combined outer configuration, layer 10, made of natural fiber encasing the layer 2. The figure shows in a effect a hose cross-section that is quadrilateral; through stitching and stiffening the assembly is shaped and so maintained.

Figure 7:
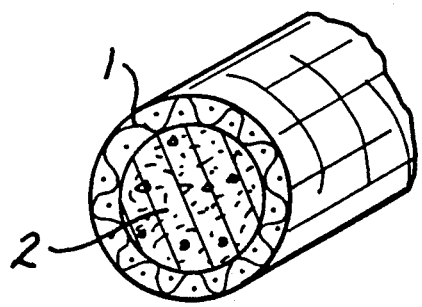
FIG. 7 is a cross section and perspective view of a different kind of hose which can be cut to accommodate round flower pots.

Finally, FIG. 7 illustrates a hose in the true, that is, cylindrical configuration, made of an outer natural fiber layer 1 which is clearly integral, and a substrate or filling 2 which can be made of any length and cut into portions of flower-pot size or other size as needed. The invention can, of course, be practiced, particularly as far as a hose-like configuration is concerned with different diameters, the diameter being at the upper and lower end simply limited by matters of practicality. Too large an arrangement will be difficult to handle, and too small a diameter may have little value.

Generally speaking, then, plant plates and plate-like plant carriers are described above which encase or enclose the plant layer 2 from all sides or most sides, and not just at top and bottom. Part of the upper natural fiber layer 1 can be cut either by just being opened or a slot such as 12 in FIG. 3 or individual openings can be cut to place seedlings or seeds into the layer 2 from above, that is, through the top layer 1. While it is of course possible to provide individual small slots, that is little openings, one for each plant, the entire plate is in fact of sufficient solidity and self-containing stability so that one or several large openings can be cut into the top layer 1, for ease of planting.

The plates and plant carriers made in the inventive manner have a variety of advantages, some of which have been mentioned. First of all, they are easily transported. Owing to the fact that the plates are sewn together by means of thread 4 permits them to retain the original shape without having the sewing exert a negative influence upon the growth of the plant. Plates made in this fashion are wettable and re-wettable and will guide any water in a suitable fashion, i.e. drainage through the lower layer 1b with its open construction is readily provided for, but a tight weave and tight mesh provides for some moisture retention; in other words, the moisture being poured in doesn't just leak out again without adding much moisture to the layer 2 in between. Moisture control is therefore an important feature to prevent root sickness. Shaping of the plate through proper sewing permits the selection of a configuration; for example, in the usual flat-type size as they are used in cultivating practice. Here, the overall size is usually determined by the requirements of ease of transportation, i.e. the plates must not be too bulky.

The natural fibers to be used are, basically, all natural fibers, such as jute, coco-nut, sisal, flax, and so forth. It is well known that these fibers require different periods of time for rotting and decomposition so that the choice here is to some extent determined by the incubation and germination periods as well as the speed of growth in general; in other words, the rotting of the natural fibers must not be faster than the growth as permitted by growth conditions for the particular plant; rotting however should not be much slower so as to avoid any ecological loading.

The shape of the plates or hose, etc. is dictated by the requirements of suitability and subsequent use of the plants. The various figures show different examples. The thickness of the plates is, of course, again determined by the root structure, speed of growth, etc. On the other hand, certain size and dimensions have become common practice in the trade and the invention is readily adaptable to these requirements. These generally accepted dimensions and configurations include flats and flower boxes of all kinds, shapes, and sizes. a hose made of natural fiber enclosing said plant layer. The natural fiber material and the plant growing material are shaped together so that they have a round or quadrilateral shape.

As stated in substance above, there is always an upper layer and a lower layer with at least one plant layer in between; in addition, there may be side layers, either separate or as a result of integral configuration, with a sack-like or a hose-like configuration as the result. Also, it has also been seen that basically two kinds of layers have been distinguished, namely the top and bottom, as well as sides and covers. These are layers 1, 1a, as well as the interconnected layers such as 1b and 1c or the separating-though-combining layers 13. All of these establish some kind of enclosure, open on one or two ends or not at all. The second kind of layer is the plant layer 2 proper in the interior. In addition, a layer such as 3 may be provided simply for reasons of establishing additional growing space without requiring (but without prohibition against) inclusion of nutrients and other plant growing and plant food material.

Particularly the hose configuration of FIG. 7 or the like is adaptable for different purposes and here primarily through variations of the diameter. Large diameters may be needed to accommodate larger plants and customary flower pots of the kind that are placed on patios and landings. On the other hand, room facilities with small scale dimensions can readily be accommodated.

One can very easily provide here individual seedling and seed conditions, ornamental plants, vegetables, horticulture in general, tree growth, vineyards and the like. Transportation is easy in that boxes, cardboard covers or the like can be used again; for example, a cardboard box a still more outer cover, can even be retained in position as cardboard usually decomposes too.

Plates of the kind described above can be adapted as stated to accommodate flower boxes but can also be used on a table, in growing facilities, as well as directly on the ground. One must, of course, consider that weeds must not grow into the plate from below. On the other hand, if replanting is required, roots should not grow into the soil underneath. Nor should weeds grow into the plant layer from below. For this purpose, one may utilize a cover of light impermeable foil material 21 to separate the inventive plate-like plant carrier from the ground. The foil 21 should also be bio-degradable. This is, however, an optional feature and is simply a matter of how long one intends to keep the inventive plate on normal soil.

The invention is not limited to the embodiments described above but all changes and modifications thereof, not constituting departures from the spirit and scope of the invention, are intended to be included.

We claim:

1. Plant carrier for cultivating plants, seedlings, seeds, or the like, comprising:
   at least one layer of plant-growing material;
   an upper layer of natural fiber;
   a lower layer of natural fiber, said upper and lower layers sandwiching the plant-growing layer in between;
   natural fiber layer means combining the upper and lower fiber layers to produce a hose-like cover; and
   thread means for stitching and sewing the upper and lower natural fiber layers together through the plant-growing layer.

2. Plate-like plant carrier as in claim 1, said upper and lower layers being in part integrally combined through said natural fiber layer means to obtain an integral enclosure that includes the natural fiber means, the upper layer, and the lower layer.

3. Plate-like plant carrier as in claim 1 wherein said natural fiber layer means and said upper and lower natural fiber layers enclose the plant growth plate layer completely.

4. Plate-like plant carrier as in claim 1 including underneath said plant growth layer another natural fiber layer different from and independent from the upper and lower layers.

5. Plate-like plant carrier as in claim 1 there being a bio-degradable foil underneath that lower fiber layer.

6. Plant carrier for cultivating plants, seedlings, seeds, or the like, comprising:
   at least one layer of plant growing material;
   a flat sack of natural fiber enclosing said plant layer, the sack having an upper and a lower layer portion when laid flat onto the ground; and
   thread means for stitching and sewing the sack of natural fiber material and the plant growing material together.

7. Plate-like plant carrier as in claim 6, said sack having upper and lower layers being of integral configuration.

8. Plate-like plant carrier as in claim 6 including underneath said plant growth layer another natural fiber layer different from and independent from the sack layers.

9. Plate-like plant carrier as in claim 6 there being a bio-degradable foil underneath a lower portion of the sack.

10. Plant carrier for cultivating plants, seedlings, seeds, or the like, having at least one layer of plant growing material, an upper layer of natural fiber, and a lower layer of natural fiber sandwiching the plant growing layer in between, the improvement comprising:
    natural fiber layer means combining the upper and lower fiber layers along at least portions of their edges to produce a hose-like cover that is filled with said plant layer of plant growing material; and
    thread means for stitching and sewing the upper and lower natural fiber layers together, the stitching to run through the layer of plant growing material.

11. Plate-like plant carrier as in claim 10 including underneath said plant growth layer another natural fiber layer different from and independent from the upper and lower layers.

12. Plate-like plant carrier as in claim 10 there being a bio-degradable foil underneath that lower fiber layer.

* * * * *